May 5, 1964 — O. M. NOREHAD — 3,131,592
CORD AND METHOD OF MAKING IT
Filed Aug. 29, 1961 — 2 Sheets-Sheet 2
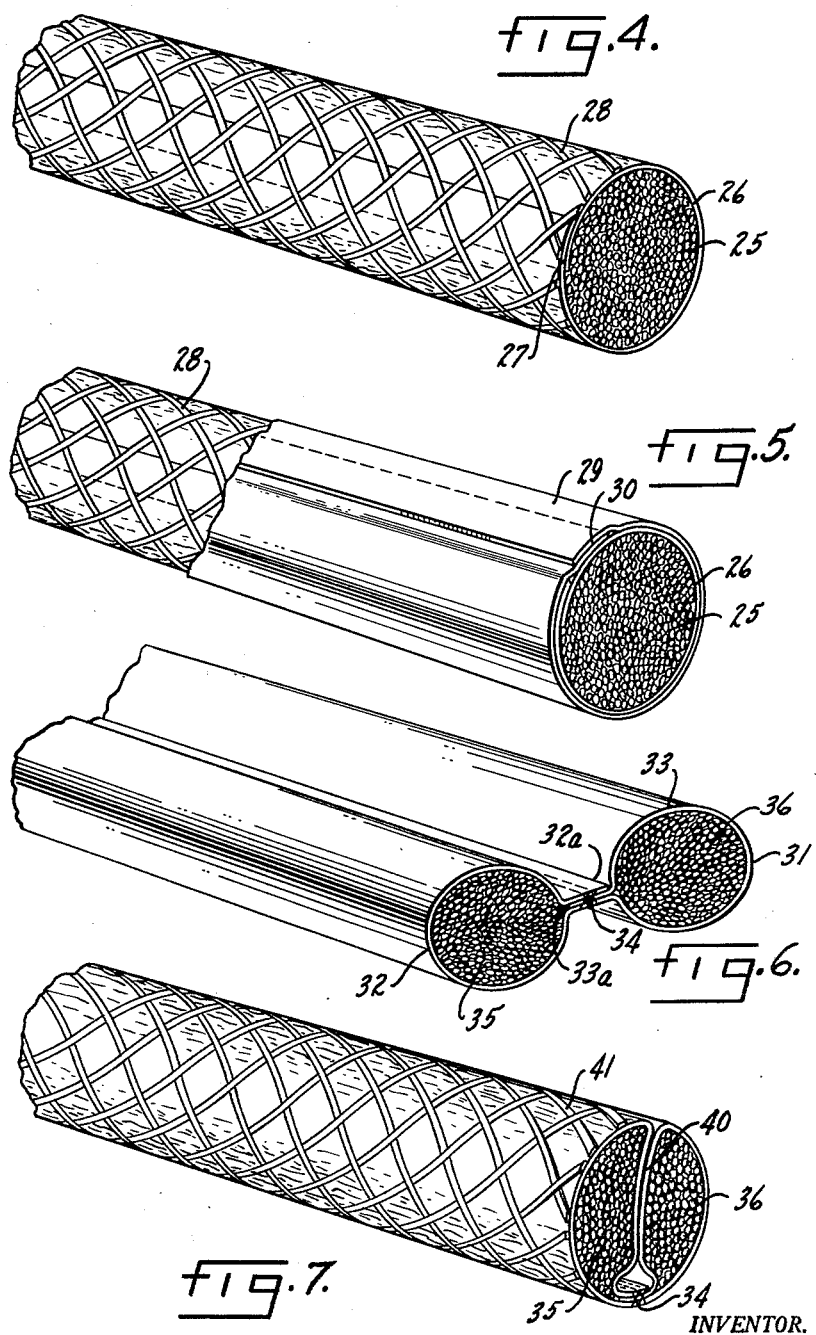
INVENTOR.
Onnig M. Norehad,
BY Parker & Carter
Attorneys.

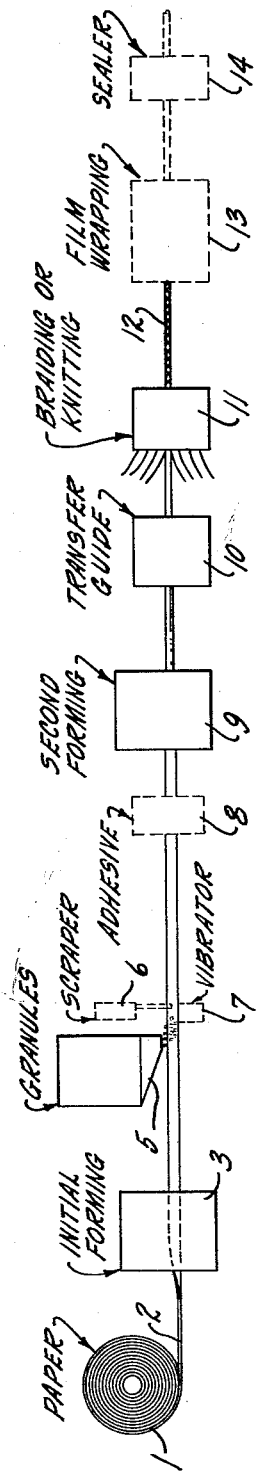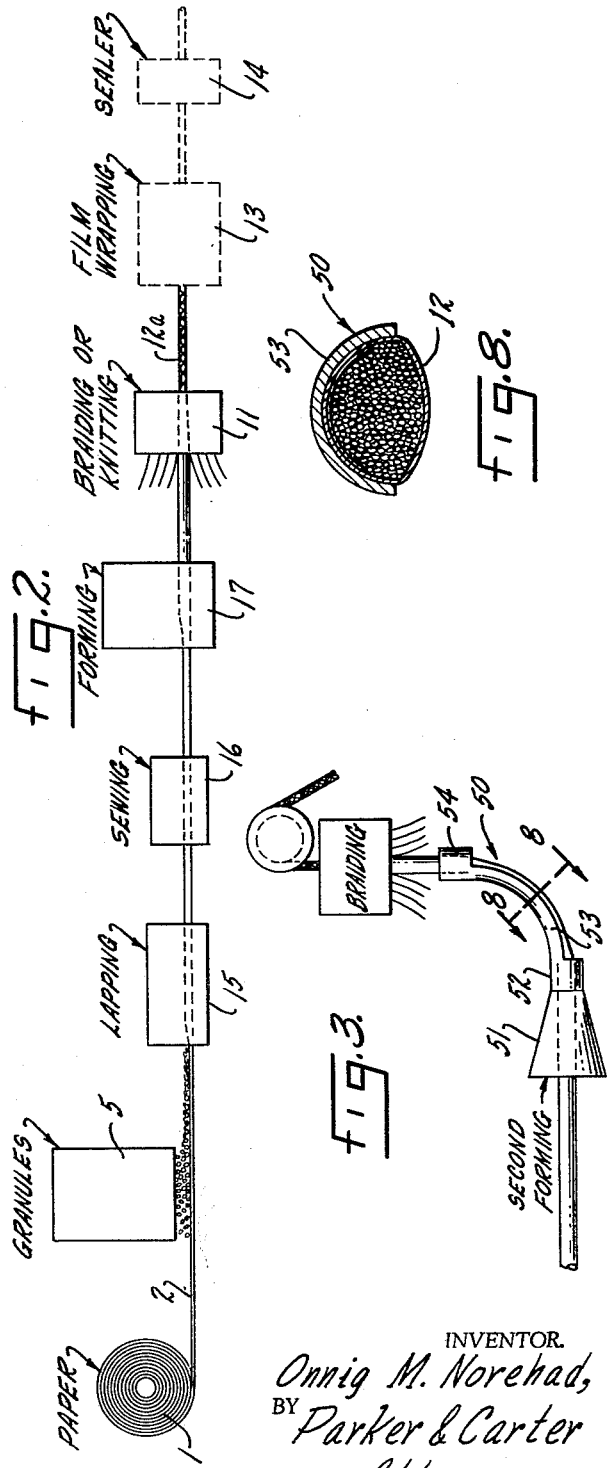

United States Patent Office 3,131,592
Patented May 5, 1964

3,131,592
CORD AND METHOD OF MAKING IT
Onnig M. Norehad, 321 Ashland Ave., Evanston, Ill.
Filed Aug. 29, 1961, Ser. No. 134,670
11 Claims. (Cl. 87—6)

This invention relates to flexible and resilient cords and to a method of making the same. In particular, the invention relates to cords which are suitable for use as gaskets in sealing chemical food containers and which may be used as edging for cushions and mattresses, slip covers and the like and as construction material and as automobile welting, for example.

One purpose of this invention is to provide an improved method of making a cord of the type described.

Another purpose is to provide a flexible and resilient cord having a compressed core formed of granulated material having the properties of rubber.

Another purpose is to provide a flexible and resilient cord having a compressed core formed of sponge-rubber granules.

Another purpose is to provide a flexible and resilient cord having a compressed core formed of granulated synthetic foam material.

Another purpose is to provide a cord for use as a gasket or the like which will serve as a positive seal and which shall be formed of materials which will not contaminate or be affected by the contents of chemical and food containers.

Another purpose is to provide a cord of the type described which has a resilient core, but which may be manufactured at a cost substantially lower than cords of this general type now available, such as cords formed of sponge rubber, or of molded or extruded rubber or synthetic materials.

Another purpose is to provide a method of forming a cord having a resilient core and an outer covering of paper, gauze or non-woven fabric.

Another purpose is to provide a method of forming a cord having a resilient core formed of individually resilient particles and outer covering, the core and covering being compressed and held together in shape by thread entwined thereabout.

Another purpose is to provide a multi-purpose cord having a resilient core and an outer covering formed of non-liquid-pervious material.

Another purpose is to provide a cord having a resilient core, a cover for said core with portions of said cover secured together in the formation of said cord.

Another purpose is to provide a means for reducing the diameter of a cord during the course of its manufacture and for retaining a supply of resilient granules within the cover of said cord during said reducing step.

Another purpose is to provide a method and means of forming a resilient cord by feeding elements thereof vertically into a braiding machine.

Another purpose is to provide a method and means for feeding resilient cord-forming elements upwardly into a cord-forming station.

Another purpose is to provide a means and method which shall permit employment of present braiding machines.

Other purposes will appear from time to time during the course of the specification and claims.

The invention is illustrated diagrammatically in the accompanying drawings wherein:

The FIGURE 1 is a diagrammatic illustration of the steps employed in a method of forming the cord of the present invention;

FIGURE 2 is a diagrammatic illustration of another method of forming a cord of the present invention herein;

FIGURE 3 is a detailed sideview illustrating a means enabling the vertical delivery of cord elements to a braiding machine for upward passage therethrough;

FIGURE 4 is a perspective view on an enlarged scale illustrating one form of the invention and of a cord produced by a method herein disclosed;

FIGURE 5 is a perspective view on the scale of FIGURE 4 and illustrating another form of the cord of the invention herein produced by a method herein disclosed;

FIGURE 6 is a perspective view on the scale of FIGURES 4 and 5 and illustrating a cord at one stage of its construction in accordance with a method herein disclosed;

FIGURE 7 is a perspective view on the scale of FIGURE 6 and illustrating the cord of FIGURE 6 after it has been manufactured; and FIGURE 8 is a view taken on line 8—8 of FIGURE 3.

Like parts are indicated by like numerals throughout the specification and drawings.

Referring now to the drawings and particularly to FIGURE 1 thereof, the numeral 1 designates generally a roll of paper, it being understood that gauze or other non-woven fabric might be employed without departing from the nature and scope of the invention. Cellulose paper wadding in strip form may also be used.

Considering paper as the material forming the cover of the cord of the invention, the paper 2 comes from the roll 1 in the form of a flat strip. An initial former 3, through which the paper strip 2 is passed, raises the sides of the strip 2 to form an upwardly open, generally U-shaped or V-shaped trough. In such configuration the strip 2 is passed beneath a hopper or granule supply 5 at which point a supply of individually resilient granules, such as those formed by granulating sponge rubber, for example, is continuously fed to the continually moving strip 2. A scraper 6 and a vibrator 7 may be employed adjacent and in association with the granule supply 5 to insure constant maintenance of the desired level or amount of granules within the trough formed of strip 2. The scraper 6 and vibrator 7, like some of the other elements illustrated in FIGURE 1, are shown in dotted lines to indicate that employment of said items may, under some circumstances, and in the production of some forms of cord, be dispensed with without departing from the nature and scope of the invention.

Illustrated in dotted lines, for example at 8, is an adhesive applicator which may, when desired, be employed to apply adhesive to the outer surface of a longitudinal edge segment of the paper trough 2.

A second forming mechanism 9 is employed downstream of the granule supply 5 to flow into overlapping relationship the opposite longitudinal edges of the trough 2. Where the adhesive applicator 8 has been employed, the former 9 is effective to overlap said edges with the film or layer of adhesive between said overlapped portions. From the former 9 the paper 2, now in the general form of a cylinder and with the granules supplied at 5 loosely supported and not under compression therein, passes through a transfer guide 10.

When the cord entered the transfer guide 10 the cover had only a loose engagement with the supply of granules therein and the granules themselves had contact with the lower and side portions of the paper cover as well as only a loose engagement with each other. In this arrangement the granules were merely supported against gravity by the horizontal positioning of the cover. When the cord left member 10 the granules therein had contact with substantially the entire inner surface of the cover, the granules had a closer engagement with each other and are supported by the tensioning of the cover surrounding them. From the member 10 the cord passes through a braiding or knitting machine or station 11. At this point a plurality of individual strands of thread or the like is entwined or braided upon the outer surface of the paper cover to compress the cover and the granules therein into a tight cylindrical cord, maintaining the granules therein under compression but retaining the desired resiliency and reducing the diameter of the resulting cord to that desired.

Following the braiding station 11, the braided cord indicated at 12 may, when the cord is desired for certain uses, be passed through a film applying station 13 at which point a synthetic film such as polyethylene or polypropylene may be wrapped or otherwise formed, as by extrusion, dipping or molding, about the outer surface of cord 12 with the longitudinal edges thereof in overlapping relationship. Thereafter the cord 12 with such film so applied may be passed through a sealing station 14, wherein, for example, heat may be applied to heat-seal the said overlapping edges together. Whether the cord is employed in the configuration indicated at 12 or whether it is passed through stations 13 and 14 will depend upon the uses to which the cord is to be put. After leaving the braiding station 11 in the former event or the sealer 14 in the latter event, the cord is cut into the desired lengths. In those instances wherein a ring-type gasket is desired, the opposite ends of such lengths are brought into abutting contact relationship and are sealed together by any suitable means such as a length of adhesive tape for example.

Referring now to FIGURE 2, I illustrate another method of forming a cord in which illustration I have used identical numbers for those stations identical with corresponding stations in FIGURE 1. In FIGURE 2, the roll 1 supplies a strip of covering material such as the paper strip 2. The strip 2 is passed in flat configuration beneath or adjacent the granule supply 5 at which point a supply of granules is deposited on the paper surface of the moving strip 2. A scraper 6 and a vibrator 7 may be employed in association with station 5 as illustrated in dotted lines in FIGURE 1.

Downstream of the granule supply 5 a lapping station 15 folds the longitudinal edges upwardly and inwardly into overlapping relationship to enclose the granules supplied at 5 within a generally elliptical cover. Thereafter the strip 2 is passed through a sewing station 16 in which the overlapping longitudinal edges are pressed downwardly toward the opposed lowermost longitudinal segment of the strip 2 and said edges and segment are sewn together as indicated in FIGURE 6, for example.

At this point the method has produced a type of dual or double-cord. In some uses the overlapped center-line area may serve as a tongue and one of the granule filled cord areas may be received in a retaining slot through which the tongue extends. For other uses the overlapped centerline area may be longitudinally split to provide two individual cords, each having a side flange available for attachment to a fixed member such as an automobile door frame, for example.

In the configuration of FIGURE 6, however, the structure may be formed into a unitary cord by moving strip 2 through a forming station 17 which rolls the opposite longitudinal portions of the strip 2 containing their individual supply of granules therein toward each other to form a generally cylindrical or roughly cylindrical cord. From the forming station 17 said cord moves through a braiding or knitting station 11 which corresponds to that illustrated in FIGURE 1. The braiding there applied forms the cord in a cylindrical shape and compresses the granules. Similarly, when the cord is to be used for certain purposes, the cord 12a leaving the braiding station 11 in FIGURE 2 may pass through the film wrapping station 13 and the heat sealing station 14.

Referring now to FIGURE 4, I illustrate a core 25 formed of a plurality of individually resilient granules. The core 25 is encased within a cover 26 illustrated schematically in FIGURES 1–3 as a strip of paper, gauze or non-woven fabric, the longitudinal edges of which are arranged in overlapping relationship, as indicated at 27. Surrounding the outer surface of cover 26 and entwined or braided thereagainst to compress the core 25 and cover 26 into the form of a cylinder, and to compress the core 25 into the desired state of resiliency, is the braiding indicated by the numeral 28, the individual strands of which are arranged in interlaced fashion, as shown in FIGURE 4.

In FIGURE 5, the cord of FIGURE 4 is in turn encased within an outer covering or film 29, which may, for example, be of polyethylene, the longitudinal edges of which are arranged in overlapping relationship, as indicated at 30. The overlapping edges of film cover 29 may be sealed in any suitable manner, for example, by the step known as heat-sealing. The overlapping 30 may also be arranged in circumferentially spaced relationship with the overlapping 27 of cover 26 for conformity of the cylindrical cord.

Referring now to FIGURE 6, I illustrate a strip 31 of paper, gauze, or non-woven fabric, the longitudinal edge segments 32, 33 of which have been bent inwardly upon the central portion of strip 31. The edges 32a, 33a of segments 32, 33 are positioned in overlapping relationship above the approximate center line of strip 31 and the edges 32a, 33a, and the center line portion of strip 31 are sewn together, as by threads indicated generally at 34. When the segments 32, 33 were bent inwardly upon the center portion of strip 31, individual groups of resilient granules, such as those indicated at 35, 36, respectively, were entrapped, as shown in FIGURE 6.

In FIGURE 7, the structure of FIGURE 6 has been formed into a cord. The strip segments 32, 33 have been again bent inwardly toward each other into abutting relationship, as indicated at 40. A braiding 41, corresponding to the braiding 28, is entwined about and in contact with the outer surface of strip 31 to form and maintain the strip 31, segments 32, 33, and granule-filled portions 35, 36 in cylindrical form and to compress the said granules to the desired state of resiliency. It will be realized that the cord of FIGURE 7 may be covered in the manner illustrated in FIGURE 5, when desired, without departing from the nature and scope of the invention.

The core 25 or 35, 36 may be formed advantageously of granules of sponge rubber. Other materials may be employed, however, so long as the core is formed of individual elastic or discrete resilient particles. Thus the core will be resilient and will resume its original shape after being deformed and, to this extent, the core of the invention will be capable of producing all of the advantages of a cord or a cord core formed entirely of rubber or rubber-like material.

Similarly, the cover 26 or 31 may be formed of a variety of materials. While, as indicated, paper has been found advantageous, gauze or non-woven fabric, as well as similar materials, may be employed. The overlapping longitudinal edges of the cover may be glued together by suitable adhesive, or may be held in overlapping relationship by the braiding or knitting 28, 41. The said braiding is formed of a thin yarn or thread braided about the cover in a preferably multiple braiding or knitting. While a particular style of braiding is illustrated, various forms thereof will prove satisfactory, providing that such braiding has sufficient strength to securely hold the cover in position, to define a cylindrical cord, and to hold the granules forming the core of the cord under compression and to reduce the original diameter of the cord to that desired.

The use and operation of the invention are as follows:

The cord illustrated herein is very flexible and yet has sufficient resiliency to be suitable as an edging for cushions, mattresses, slip covers, or automobile door welting, and the like.

The cord shown herein may also be used as a gasket for sealing chemical and food containers, in some instances. When used in such an application, a film may be provided around the cord shown in FIGURE 4, as illustrated in FIGURE 5. The said film, illustrated at 29, is formed of non-toxic material, such as polyethylene or polypropylene. Thus the core, cover and braiding of the cord illustrated in FIGURE 5 is protected by the film cover 29, and will not be affected by the contents of chemical or food containers, for example.

The method illustrated schematically in FIGURE 1 comprises the delivery of a continual supply of resilient granules to the upper surface of a continually moving strip 2. To maintain the correct level or amount of the granules, the strip 2 is shaped in the form of a trough, and a vibrator and scraper may also be employed in achieving the maintenance of the desired level. The strip 2 then passes into a former, which receives it and forms it into a loose cylinder which encloses the granules without compressing them. Thereafter, the cylinder paper, with the granules loosely contained therein, are subjected to a braiding or knitting process wherein a strand or plurality of strands is braided or knitted or entwined in interrelationship on the outer surface of the cylinder. It will be understood that the strand or strands about the cover may be interlaced as shown or may be knitted or spiralled about the cover. For convenience I have selected the terms "braid," "braided" and "braiding" to connote the strand or strands spiralled, wrapped or entwined about the cover and the step of applying them. I wish these terms so understood as used in the claims herein.

In this braiding process, the granules are compressed. The compression ratio may be, for example, of the order of 1 to ½, and this may be varied according to the desired density or compressibility of the resulting cord.

One feature of the invention is the passage of the cord-forming elements upwardly through the braiding machine or station. In such machine, the cord is pulled through the machine over a pulley positioned thereabove. It is this pulling action which moves the paper strip 2 through the entire method from the roll 1 to the completed cord. Such method involves the initial movement of the strip 2 through a horizontal path onto which the granules are deposited, and the transfer of the strip 2 from horizontal movement to upwardly vertical movement. I have found a method and means for retaining the granules against the action of gravity and in the desired density or quantity within the loose cylinder of the paper strip 2 during the transfer thereof from horizontal to vertical movement and for delivery upwardly into the braiding station or machine.

In FIGURES 3 and 8, I illustrate a transfer guide 50. A forming member 51, which may be positioned at the second forming station 9, illustrated schematically in FIGURE 1, comprises a cone, the mouth of which is larger than the diameter of the loose cylinder formed of strip 2 by the member 51 during its excursion therethrough. The outlet of member 51 has a diameter corresponding to that of said loose cylinder, and delivers the same to the inlet of the transfer guide 50. The guide 50 has an inlet sleeve 52 forming its inlet into which the loose cylinder formed by member 51 is pulled. A track 53, generally concave in cross section, as illustrated in FIGURE 8, extends from and constitutes a continuation of the upper portion of inlet sleeve 52. The member 53 is curved from the horizontal upwardly, and terminates in an outlet sleeve 54, having an inner diameter corresponding to that of inlet sleeve 52. The member 50 may thus be considered as a tube or pipe bent in a curve of approximately 90 degrees of arc and having the lower or outermost segment of its curved portion removed. By limiting friction of the strip 2 to contact of the upper portion thereof with the track 53, the member 50 is effective to permit the application of tension to all portions of the strip 2, and thus to the granules contained therein, while limiting the friction or resistance to movement of the strip 2 through the member 50 to a point sufficient to preclude tearing or breaking of the strip 2 as it is pulled through the member 50. Moreover, as best seen in FIGURE 8, the overlapping areas of the cover are drawn along and against the undersurface of track 53. Hence the strongest, double-thickness, area of the cover is subjected to the friction within member 50 and most of the weaker, single thickness area of the cover is exposed to atmosphere and subjected to no contact with track 53.

Thus, a cord is produced by forming a trough of the strip 2, depositing a predetermined amount of granules therein, converting the trough into a cylinder by overlapping the edges of same without exerting undue pressure upon the strip or the granules therein, by moving the thus-formed cylinder through a linearly curved throat, the lower or outer central portion of which is removed to facilitate the passage of the cord elements comprising the cylinder thus formed therethrough. The outlet of the curved throat is in the form of a sleeve to retain the cylindrical form thereof as the cylinder leaves the throat after an excursion of approximately 90 degrees into a vertical plane. In its transfer from horizontal to vertical movement, the wall of the cylinder formed of strip 2 and encasing the granules exerts a gradual pressure on said granules while being pulled upwardly under tension for delivery to the braiding station or machine.

Thereafter, the cylinder, being held taut under tension, is subjected to the entwining pressure of each strand of yarn forming the braid 28, 41 and the diameter of the cylinder is reduced to that desired, the resilient granules of the core being compressed to the desired state of density, compressibility or resiliency.

The device and method illustrated in FIGURES 3 and 8 are effective to retain the granules in the desired quantity and density against the force of gravity acting thereupon as the cylinder formed of strip 2 is transferred from horizontal to vertical movement and delivered to the braiding machine. At the same time, the provision for minimum frictional contact area between strip 2 and the throat 50 and the application of such friction at the strongest point of the strip 2 protects against tearing or breakage of the strip 2 as it is pulled through the throat 50 and transferred from horizontal to vertical movement.

The braiding or knitting process reduces the diameter of the cylinder formed of strip 2. While the diameter thereof is preferably reduced approximately in half, it will be realized that the reduction in the diameter may be varied to suit the intended use of the resulting cord. In all events, the resilient granules within the paper cover will be compressed to form a flexible, resilient, tightly packed core for the cord. The resulting cord is one of uniformity of cylindrical cross section and yet of sufficient resiliency to resist permanent deformation. In that form in which a non-liquid-pervious film is provided as a cover, the cord of the invention may be used as a sealer or gasket of food or chemical product containers with all of the advantages and attributes of cords now so used and formed by molding or extruding rubber or rubber-like materials.

Whereas I have described and claimed a preferred embodiment of the invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

I claim:

1. A flexible cord including a cylindrical hollow cover formed of paper-like material and having overlapping longitudinal edges, a cylindrical core within said paper cover including individual sponge rubber granules, the diameter of said paper cover relative to the volume of granules being such that the granules are compressed, and interwoven braiding holding said cover about said granules in said overlapping relationship and subjecting said granules to compression.

2. A method of making a flexible cord including the steps of providing a paper-like cover for said cord and placing distortable elastic granules on said cover prior to forming it into cylindrical form, thereafter forming said cover into a generally cylindrical form about said granules, then applying braiding to said cylindrical cover to reduce its diameter and to compress the distortable elastic granules within the core, and then applying a plastic film about said compressed cord after the braiding has been applied thereto.

3. The method of making a flexible cord including the steps of providing an elongated strip, placing a quantity of resilient granules on said strip, forming said strip about said granules into a generally cylindrical cover without compressing the granules, and thereafter applying braiding to said cover to reduce its diameter approximately in half and to compress the granules within the cover.

4. A resilient cord comprising a strip of paper, the longitudinal edges of said paper being arranged in overlapping relationship and secured to an opposed longitudinal segment of said strip, a supply of resilient granules enclosed within said strip on opposite sides of said overlapped segments, the portions of said strip on opposite sides of said overlapped segments being folded into contact with each other and surrounded by braiding, said braiding maintaining said granules under compression.

5. The method of forming a resilient cord which comprises the steps of continuously depositing a supply of resilient granules on one surface of a moving longitudinal strip, folding the opposite longitudinal edge areas of said strip into overlapping relationship, and securing said overlapped areas to an opposed longitudinal segment of said strip.

6. The method of claim 5 characterized by and including the step of dividing said cord longitudinally throughout its length along the approximate center line of the overlapped areas.

7. The method of forming a resilient cord which comprises the steps of initially forming a continuously moving strip in the cross sectional conformation of a trough, continuously supplying a substantially uniform quantity of resilient granules within said trough, thereafter moving the longitudinal upper edges of said trough into overlapping relationship to form a cylinder encasing said granules, and thereafter continuously applying a supply of thread to the outer surface of said cylinder and tightening said thread about said cylinder to reduce the diameter thereof and to place said strip and granules under compression.

8. The method of forming a cord which comprises the steps of moving a strip of paper in a horizontal plane, forming said paper in the cross sectional conformation of a trough, continuously supplying a predetermined level of resilient granules to said trough, forming said trough about said granules in the form of a cylinder, moving said cylinder from said horizontal plane into a vertical plane, moving said cylinder upwardly in said plane and there continuously applying a thread to the outer surface of said cylinder and reducing the diameter of said cylinder by means of said thread.

9. The method of forming a cord which comprises the steps of pulling a strip of paper through an initial forming station, forming said strip into a trough at said station, continuously supplying resilient granules to said trough while continuing to pull said strip, forming said trough at a second forming station into a cylinder about said granules, transferring said cylinder from horizontal to upwardly vertical movement, applying a braided thread to the outer surface of said cylinder while continuing to move said cylinder upwardly in a vertical plane, reducing the diameter of said cylinder and compressing the granules therewithin by tightening said thread about said cylinder.

10. The method of forming a resilient cord which comprises the steps of pulling a strip of paper through a horizontal plane, continuously applying a supply of resilient granules to the upper surface of said strip, lapping the longitudinal edges of said strip over said resilient granules and sewing said longitudinal edges in overlapped relationship to an opposed center line longitudinal segment of said strip, folding the portions of said strip on opposite sides of said longitudinal segments into contact one with the other and thereafter applying an outer cover formed of braided thread, said thread being applied in compression-producing relationship with said strip and said granules and reducing the diameter thereof.

11. The method of forming a resilient cord comprising the steps of forming a longitudinal strip into a trough, moving said trough in a generally horizontal plane, supplying a predetermined quantity of individual resilient granules to said trough, folding said strip into the general form of a cylinder with the longitudinal edge areas of said strip in overlapping relationship, pulling said strip about an upwardly curved member with said overlapped areas in contact with said member, moving said cylinder in a horizontal plane, and there applying a strand to said cylinder and tightening said strand about said cylinder to reduce its diameter and to compress said granules within said cylinder.

References Cited in the file of this patent

UNITED STATES PATENTS

| 306,348 | Pettengill | Oct. 7, 1884 |
| 365,137 | Libbey | June 21, 1887 |
| 1,180,094 | Williams | Apr. 18, 1916 |
| 2,096,606 | Buhler | Oct. 19, 1937 |
| 2,107,467 | Buhler | Feb. 8, 1938 |
| 2,248,123 | Sackner | July 8, 1941 |
| 2,334,399 | Fether | Nov. 16, 1943 |
| 2,467,821 | Gregg | Apr. 19, 1949 |
| 2,503,791 | Boersma | Apr. 11, 1950 |

FOREIGN PATENTS

| 602,368 | France | Dec. 23, 1925 |
| 471,574 | Germany | Feb. 14, 1929 |
| 17,697 | Great Britain | 1906 |